(12) United States Patent
Sugaya

(10) Patent No.: US 9,922,049 B2
(45) Date of Patent: Mar. 20, 2018

(54) INFORMATION PROCESSING DEVICE, METHOD OF PROCESSING INFORMATION, AND PROGRAM FOR PROCESSING INFORMATION

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 176 days.

(21) Appl. No.: 14/982,283

(22) Filed: Dec. 29, 2015

(65) Prior Publication Data
US 2017/0091920 A1 Mar. 30, 2017

(30) Foreign Application Priority Data

Sep. 24, 2015 (JP) .................. 2015-187144

(51) Int. Cl.
G06K 9/00 (2006.01)
G06F 17/30 (2006.01)
A01M 29/00 (2011.01)
G08B 15/00 (2006.01)
G06T 7/70 (2017.01)
G08B 13/196 (2006.01)

(52) U.S. Cl.
CPC ....... *G06F 17/30259* (2013.01); *A01M 29/00* (2013.01); *G06K 9/00771* (2013.01); *G06T 7/70* (2017.01); *G08B 15/00* (2013.01); *G06K 9/00362* (2013.01); *G06T 2207/30232* (2013.01); *G08B 13/19602* (2013.01)

(58) Field of Classification Search
CPC ................. G06F 17/30259; G06T 7/70; G06T 2207/30232; A01M 29/00; G06K 9/00771; G06K 9/00362
See application file for complete search history.

(56) References Cited

U.S. PATENT DOCUMENTS

| 7,059,275 B2* | 6/2006 | Laitinen | A01K 11/008 119/720 |
| 7,654,217 B2* | 2/2010 | Sullivan | A01M 29/06 116/22 A |
| 8,704,668 B1* | 4/2014 | Darrell | A01K 29/005 340/500 |

(Continued)

FOREIGN PATENT DOCUMENTS

JP 2015-67443 4/2015

*Primary Examiner* — Kim Vu
*Assistant Examiner* — Molly Delaney
(74) *Attorney, Agent, or Firm* — Lex IP Meister, PLLC

(57) ABSTRACT

The present invention is to provide an information processing device, a method of processing information, and a program for processing information to easily identify the location of the monitoring object and to reduce the cost. The information processing device 10 that monitors the monitoring object includes a location information database that associates the vertical and horizontal position of the image data captured by a fixed camera with actual location information corresponding to the position, judges whether or not the monitoring object is imaged in the image data, and outputs actual location information corresponding to the position of the image data to which the monitoring object is imaged, based on the location information database if the monitoring object is judged to be imaged.

10 Claims, 10 Drawing Sheets

(56) References Cited

U.S. PATENT DOCUMENTS

| | | | | |
|---|---|---|---|---|
| 9,171,461 B1* | 10/2015 | Dabell | ................ | G08G 1/0137 |
| 9,666,050 B2* | 5/2017 | Wu | ...................... | G08B 17/125 |
| 2007/0163516 A1* | 7/2007 | D'Andrea | ............. | A01M 29/06 |
| | | | | 119/713 |
| 2010/0201525 A1* | 8/2010 | Bahat | .................... | A01M 29/10 |
| | | | | 340/573.2 |
| 2016/0026895 A1* | 1/2016 | Huffman | ................ | H04N 7/181 |
| | | | | 382/110 |
| 2016/0037131 A1* | 2/2016 | Burnett | ................. | G08B 13/08 |
| | | | | 348/152 |
| 2016/0176542 A1* | 6/2016 | Wilkins | ............... | A01M 27/00 |
| | | | | 348/144 |

* cited by examiner

Fig. 8

LOCATION INFORMATION DATABASE

| IMAGE LOCATION | GPS COORDINATES (LATITUDE, LONGITUDE) |
|---|---|
| X00,Y00 | A1 degrees A2 minutes A3 seconds, a1 degrees a2 minutes a3 seconds |
| X01,Y00 | B1 degrees B2 minutes B3 seconds, b1 degrees b2 minutes b3 seconds |
| ⋮ | ⋮ |
| X10,Y10 | C1 degrees C2 minutes C3 seconds, c1 degrees c2 minutes c3 seconds |
| ⋮ | ⋮ |
| X100,Y100 | Z1 degrees Z2 minutes Z3 seconds, z1 degrees z2 minutes z3 seconds |

| | |
|---|---|
| X1000,Y1000 | X10 degrees X10 minutes X10 seconds, Y10 degrees Y10 minutes Y10 seconds |

Fig. 9
MONITORING OBJECT DATABASE
| IMAGE DATA | TYPE | Intimidating method |
|---|---|---|
|  | Fox | Light |
|  | Wild boar | Sound |
| ⋮ | ⋮ | ⋮ |

INFORMATION PROCESSING DEVICE, METHOD OF PROCESSING INFORMATION, AND PROGRAM FOR PROCESSING INFORMATION

CROSS REFERENCE TO RELATED APPLICATIONS

This application claims priority to Japanese Patent Application No. 2015-187144 filed on Sep. 24, 2015, the entire contents of which are incorporated by reference herein.

TECHNICAL FIELD

The present invention relates to an information processing device, a method of processing information, and a program for processing information that monitors a monitoring object.

BACKGROUND ART

In recent years, an imaging device such as a camera is used to image an article and to specify the position of this article.

To specific the position of such an article, a configuration is disclosed to identify an article and a location of the article by previously attaching a marker for identification to the article and imaging this article with an imaging device provided with a specific function (refer to Patent Document 1).

CITATION LIST

Patent Literature

Patent Document 1: JP 2015-67443 A

SUMMARY OF INVENTION

According to Patent Document 1, an article attached with a marker for identification is imaged by an imaging device provided with the fish-eye lens, and the image recognition is performed on the obtained image data to detect a marker attached to the article. The position of the article is recognized by the detected marker and the position of the marker in the picture data detected by image recognition.

However, in the configuration disclosed in Patent Document 1, it is not possible to identify an article when a marker is not previously attached to the article and the fish-eye lens are necessary to image the article, so it is difficult to recognize the location of an object to which a marker for identification cannot be attached, and the cost might rise by using the fish-eye lens.

Then, in the present invention, the inventor has paid attention that a location of a monitoring object can be easily specified and a cost can be reduced by specifying the actual location of a monitoring object imaged by an imaging device based on the location of the monitoring object in a photographic image data captured by the imaging device.

Accordingly, an objective of the present invention is to provide an information processing device, a method of processing information, and a program for processing information to easily identify a location of the monitoring object and to reduce the cost.

In the present invention, the following resolution approaches are provided.

According to the first aspect of the present invention, an information processing device that monitors a monitoring object includes:
a location information database that associates a vertical and horizontal position of an image data captured by a fixed camera with actual location information corresponding to the position;
a monitoring object judgment unit that judges whether or not the monitoring object is imaged in the image data; and
a location information output unit that outputs actual location information corresponding to the position of the image data to which the monitoring object is imaged, based on the location information database if the monitoring object is judged to be imaged.

According to the first aspect of the present invention, an information processing device that monitors an monitoring object, includes a location information database that associates the vertical and horizontal position of the image data captured by the fixed camera with actual location information corresponding to the position, judges whether or not the monitoring object is imaged in the image data, and outputs actual location information corresponding to the position of the image data to which the monitoring object is imaged, based on the location information database if the monitoring object is judged to be imaged.

The first aspect of the present invention is the category of an information processing device, but the categories of a method of processing information and a program for the information processing device have the same functions and effects According to the second aspect of the present invention, the information processing device according to the first aspect of the present invention, wherein the location information output unit transmits actual location information to a wireless aircraft.

According to the second aspect of the present invention, the information processing device according to the first aspect of the present invention transmits actual location information to a wireless aircraft.

According to the third aspect of the present invention, the information processing device according to the first or the second aspect of the present invention, includes:
a monitoring object database that previously stores image data of the monitoring object to be used for judging a monitoring object,
wherein the monitoring object judgment unit judges whether or not the monitoring object is imaged by applying image recognition based on the image data stored in the monitoring object database, and
an intimidating unit that intimidates by various lights or sound emission based on a type of the imaged monitoring object if the monitoring object is judged to be imaged.

According to the third aspect of the present invention, the information processing device according to the first or the second aspect of the present invention, includes a monitoring object database that previously stores image data of the monitoring object to be used for judging a monitoring object, judges whether or not the monitoring object is imaged by applying image recognition based on the image data stored in the monitoring object database, and intimidates by various lights or sound emission based on a type of the imaged monitoring object if the monitoring object is judged to be imaged.

The present invention provides an information processing device, a method of processing information, and a program for processing information to easily identify a location of the monitoring object and to reduce a cost.

BRIEF DESCRIPTION OF DRAWINGS

FIG. 8 shows a figure illustrating the location information database stored by the information processing device 10.

FIG. 9 shows a figure illustrating the monitoring object database stored by the information processing device 10.

Embodiments of the present invention are described below with reference to the attached drawings. However, this is illustrative only, and the scope of the present invention is not limited thereto.

Overview of Information Processing System 1

Figure 1:
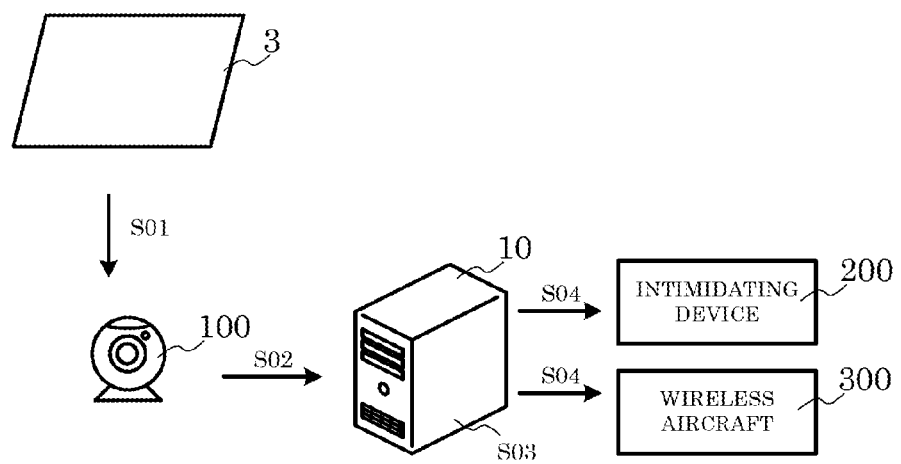
FIG. 1 shows an overview of the information processing system 1.

FIG. 1 shows an overview of the information processing system 1 according to a preferred embodiment of the present invention. The information processing system 1 includes an imaging target area 3, an information processing device 10, a fixed camera 100, an intimidating device 200, and a wireless aircraft 300.

The imaging target area 3 is a place such as field, forest, privately owned area, and public use ground, etc. at which the monitoring object is monitored describe later.

The information processing device 10 is a server device capable of data communication with the fixed camera 100, the intimidating device 200, and the wireless aircraft 300.

The fixed camera 100 is an imaging device to image the target area 3 and capable of data communication with the information processing device 10. Moreover, the fixed camera 100 is fixed to the designated position and images the target area 3.

The intimidating device 200 may be a sound emission device or a light emission device such as a speaker or lights, by which the intimidating of the monitoring object is possible by sound emission, light emission, and other methods.

The wireless aircraft 300 is an unmanned aircraft vehicle capable of flying in the air with its own propeller etc.

In this embodiment, the imaging target area 3 is a place such as a field where farm products are grown, and the monitoring object is destructive animal damaging these farm products. The imaging target area 3 may be a forest, a privately owned area, a public use ground as mentioned above or may be other places. Moreover, the monitoring object may be anything except the destructive animal such as a suspicious person and other illegal disposal thing.

First, the fixed camera 100 images an image such as a still image or a dynamic image of the imaging target area 3 (step S01). In step S01, the fixed camera 100 may image the image at every predetermined time or keep imaging of the image.

Next, the fixed camera 100 transmits the photographic image data of the image to the information processing device 10 (step S02).

The information processing device 10 receives the photographic image data transmitted from the fixed camera 100 and judges whether or not the monitoring object is included in this photographic image data (step S03). In step S03, the information processing device 10 extracts the feature of the photographic image data, and judges whether or not the monitoring object is included in the photographic image data based on the monitoring object database previously storing image data of monitoring object, by comparing with a feature of the image data of the monitoring object stored in the monitoring object database.

The information processing device 10 outputs actual location information corresponding to the position, based on the location information database associating actual location information corresponding to the position of the photographic image data from the location in the photographic image data where this monitoring object exists to the intimidating device 200 or the wireless aircraft 300 if judging that the monitoring object is imaged in the photographic image data (step S04). In step S04, the location information database associates the vertical and horizontal position of the image data captured by the fixed camera 100 with actual location information corresponding to the vertical and horizontal position. That is, the information processing device 10 acquired the vertical and horizontal position of the photographic image data of the monitoring object verified by the image recognitions, and then acquired actual location information associated with the vertical and horizontal position of the photographic image data from the location information database. The information processing device 10 outputs actual location information acquired in such a way to the intimidating device 200 or the wireless aircraft 300.

Configuration of the Information Processing System 1

Figure 2:
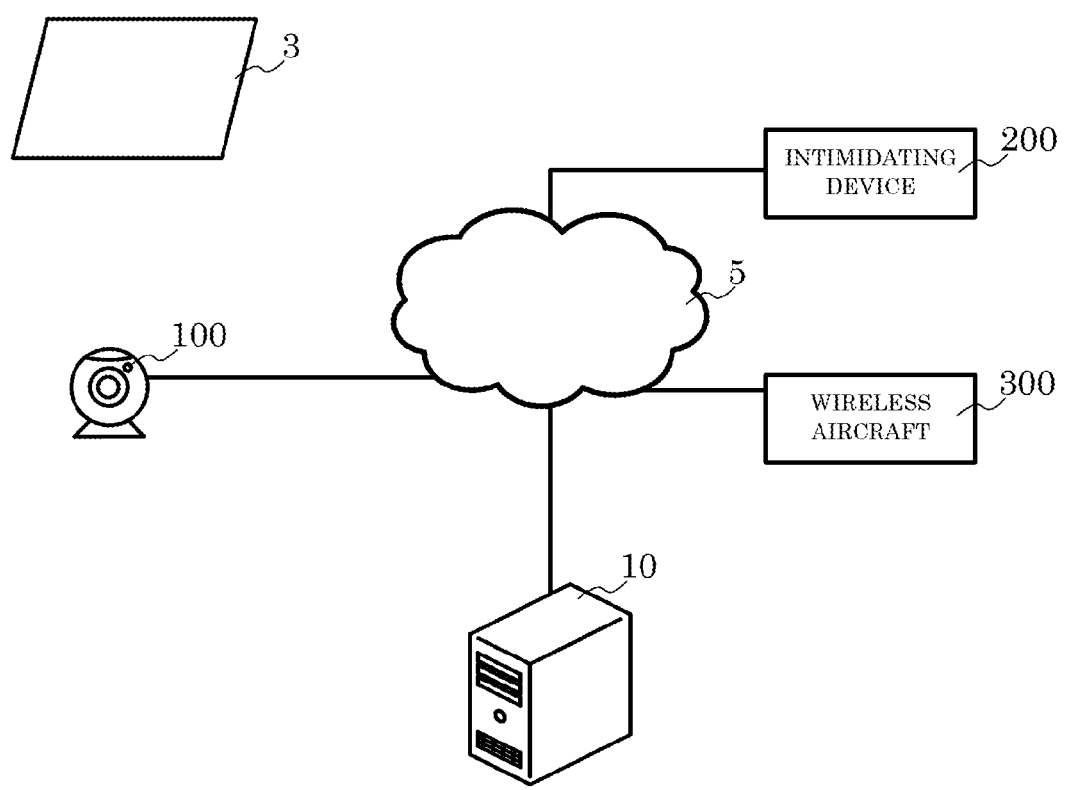
FIG. 2 shows an overall schematic diagram of the information processing system 1.
Figure 3:
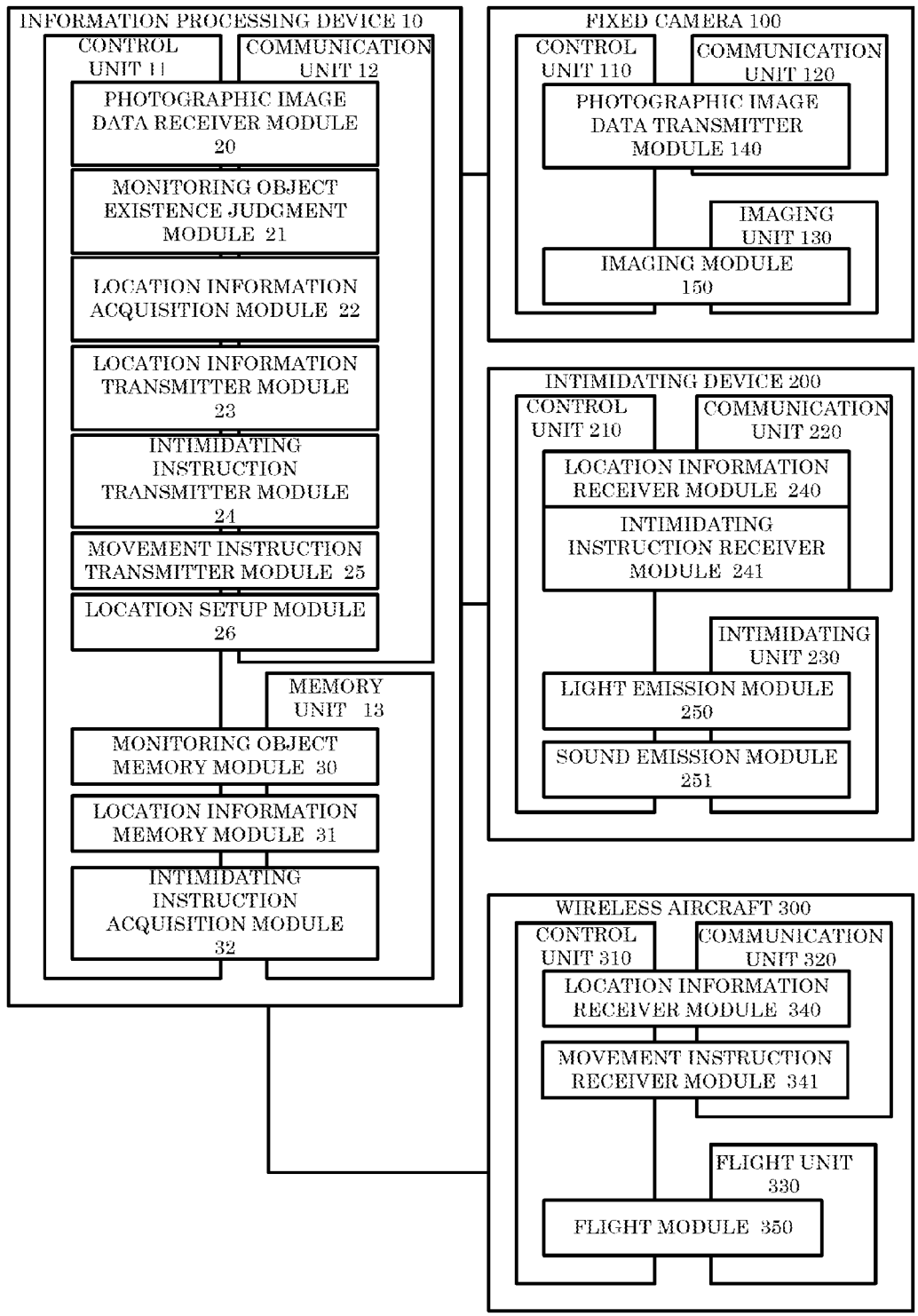
FIG. 3 shows a functional block diagram of the information processing device 10, the fixed camera 100, the intimidating device 200, and the wireless aircraft 300.

FIG. 2 shows a system schematic diagram of the information processing system 1 according to a preferred embodiment of the present invention. The information processing system 1 includes an imaging target area 3, a public line network 5 (Internet network, third and fourth generation communication networks, etc.), an information processing device 10, a fixed camera 100, an intimidating device 200, and a wireless aircraft 300.

The imaging target area 3 is a place, such as fields where crops are grown, a forest, etc. which were planted, or a private or public land. In this embodiment, the imaging target area 3 is a field where farm products are grown. Additionally, it should be understood that the imaging target area 3 is not limited to the example described above and may be various places.

The information processing device 10 is a server device provided with a monitoring object database and a location information database described later. The information processing device 10 is communicatively connected with the fixed camera 100, the intimidating device 200, and the wireless aircraft 300.

The fixed camera 100 is an imaging device imaging such as a still image or dynamic image of the imaging target area 3. Moreover, the fixed camera 100 is fixed to the designated position and images the imaging target area 3.

The intimidating device 200 is a light device, sound emission devices or other device for intimidating a monitoring object. The intimidating device 200 is connected with the information processing device 10 capable of data communication, receives execution instruction commands from the information processing device 10 to execute various processes, and each process is executed based on the instruction details of the received execution instruction command.

The wireless aircraft 300 provides with the functions described later and flies in the air with the propeller etc. of its own. The wireless aircraft 300 is connected with the information processing device 10 capable of data communication, receives execution instruction commands from the information processing device 10 to execute various processes, and each process is executed based on the instruction details of the received execution instruction command. Moreover, the wireless aircraft 300 is capable of automatic control based on the predetermined behaviors which is programmed in it.

Functions

The information processing device 10 is provided with a central processing unit (hereinafter referred to as "CPU"), a random access memory (hereinafter referred to as "RAM"), and a read only memory (hereinafter referred to as "ROM"); and a communication unit 12 including a Wireless Fidelity or Wi-Fi® enabled device complying with, for example, IEEE 802.11. Moreover, the communication unit 12 is provided with a device for near field communication such an IR communication, a device to send and receive radio wave of predetermined bandwidth, and a device to acquire the location information of the current position or the specified place from the GPS system.

The information processing device 10 is also provided with a memory unit 13 such as a hard disk or a semiconductor memory, a recording media, or a memory card as a storage unit. The memory unit 13 also includes the monitoring object database and the location information database described later.

In the information processing device 10, a control unit 11 reads a predetermined program and cooperates with a communication unit 12 to achieve a photographic image data receiver module 20, a monitoring object existence judgment module 21, a location information acquisition module 22, a location information transmitter module 23, an intimidating instruction transmitter module 24, a movement instruction transmitter module 25, and a location setup module 26. Moreover, the control unit 11 reads a predetermined program and cooperates with a memory unit 13 to achieve a monitoring object memory module 30, a location information memory module 31, and an intimidating instruction acquisition module 32.

The fixed camera 100 is provided with a control unit 110 including a CPU, a RAM, and a ROM; and a communication unit 120 including a Wireless Fidelity or Wi-Fi® enabled device complying with, for example, IEEE 802.11 enabling the communication with other devices in the same way as the information processing device 10. Moreover, the fixed camera 100 also includes a device to image pictures such as lens or an imaging device as an imaging unit 130.

In the fixed camera 100, a control unit 110 reads a predetermined program and cooperates with a communication unit 120 to achieve a photographic image data transmitter module 140. Moreover, the control unit 110 reads a predetermined program and cooperates with an imaging unit 130 to achieve an imaging module 150.

The intimidating device 200 is provided with a control unit 210 including a CPU, a RAM, and a ROM; and a communication unit 220 including a Wireless Fidelity or Wi-Fi® enabled device complying with, for example, IEEE 802.11 enabling the communication with other devices in the same way as the information processing device 10. Moreover, the intimidating device 200 includes a light emission device to emit or blink the light and a sound emission device such as a speaker as an intimidating unit 230 for intimidating a monitoring object. The intimidating device 200 may include other device as an intimidating unit 230.

In the intimidating device 200, a control unit 210 reads a predetermined program and cooperates with a communication unit 220 to achieve a location information receiver module 240 and an intimidating instruction receiver module 241. Moreover, the control unit 210 reads a predetermined program and cooperates with an intimidating unit 230 to achieve a light emission module 250 and a sound emission module 251.

The wireless aircraft 300 is provided with a control unit 310 including a CPU, a RAM, and a ROM; and a communication unit 320 including a Wireless Fidelity or Wi-Fi® enabled device complying with, for example, IEEE 802.11 enabling the communication with other devices in the same way as the information processing device 10. Moreover, the wireless aircraft 300 includes devices for the flight such as a propeller and a motor driving a propeller as a flight unit 330.

In the wireless aircraft 300, a control unit 310 reads a predetermined program and cooperates with a communication unit 320 to achieve a location information receiver module 340 and a movement instruction receiver module 341. Moreover, in the wireless aircraft 300, a control unit 310 reads a predetermined program and cooperates with a flight unit 330 to achieve a flight module 350.

Location Information Output Process

Figure 4:
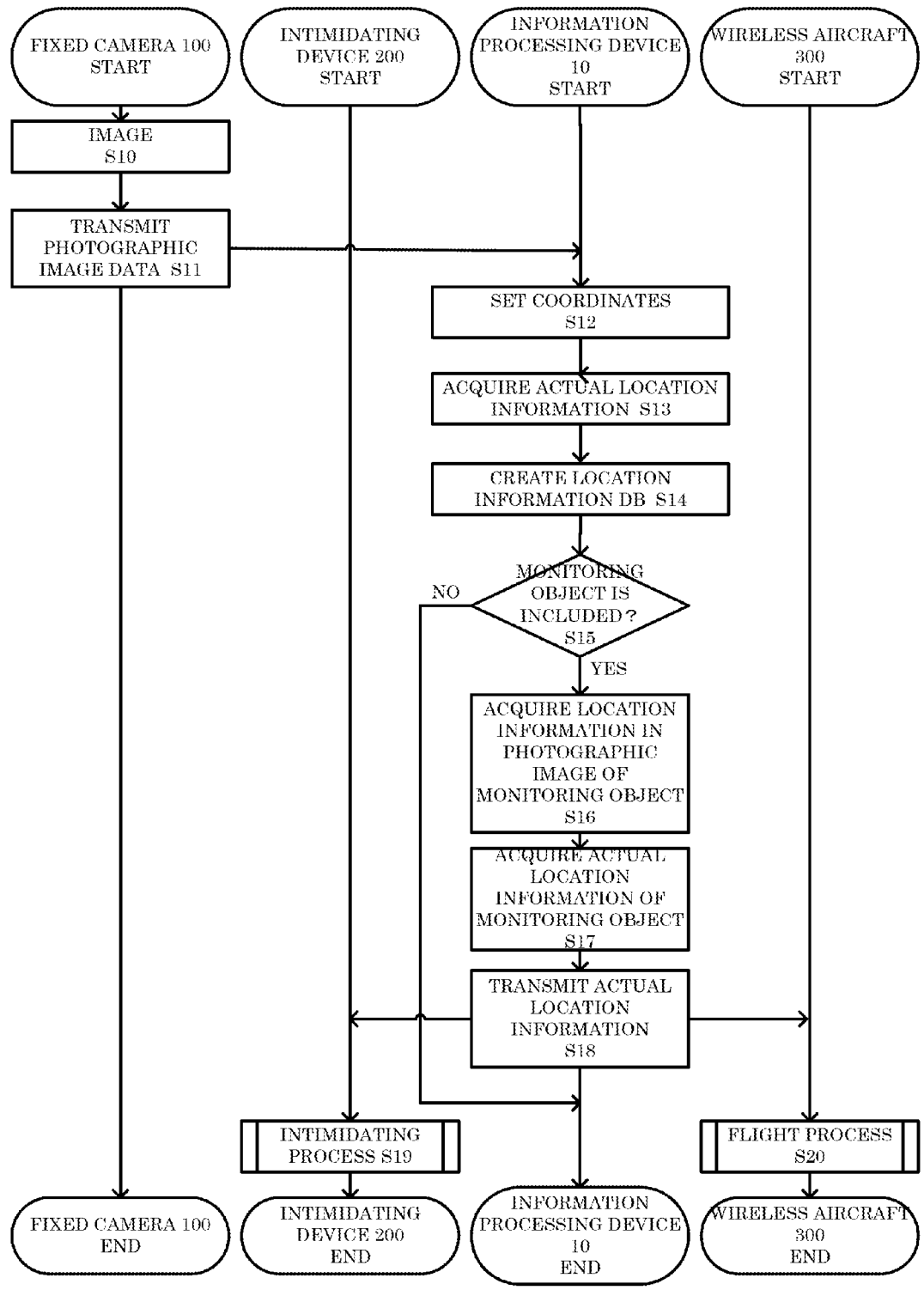
FIG. 4 shows a flow chart of the location information output process executed by the information processing device 10, the fixed camera 100, the intimidating device 200, and the wireless aircraft 300.

FIG. 4 shows a flow chart of the location information output process executed by the information processing device 10, the fixed camera 100, the intimidating device 200, and the wireless aircraft 300. The tasks executed by the modules of the above-mentioned devices will be explained below together with this process.

First, the imaging module 150 of the fixed camera 100 captures the image data of the imaging target area 3 (step S10). In step S10, the imaging module 150 may image the data at a predetermined time interval, such as every 10 seconds, 30 seconds, 1 minute, 5 minutes and 10 minutes or may always keep on imaging the image.

The photographic image data transmitter module 140 of the fixed camera 100 transmits the photographic image of the imaging target area 3 imaged by the imaging module 150 of the fixed camera 100 in step S10 to the information processing device 100 as photographic image data (step S11).

The photographic image data receiver module 20 of the information processing device 10 receives the photographic image data transmitted from the fixed camera 100.

Figure 7:
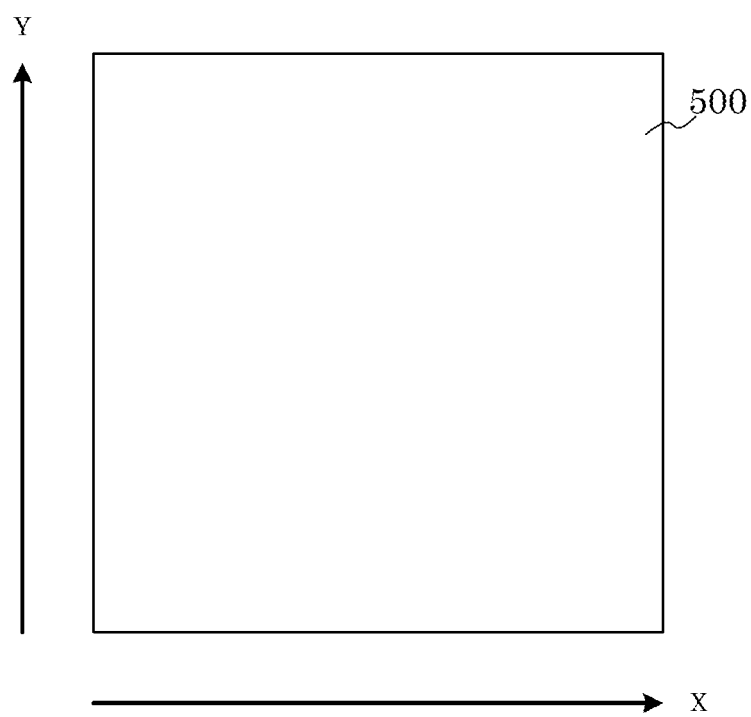
FIG. 7 shows a figure illustrating the photographic image 500 imaged by the fixed camera 100.

The location setup module 26 of the information processing device 10 regards the photographic image data received from the fixed camera 100 as the photographic image 500 shown in FIG. 7 and sets coordinate for each pixel of the photographic image data (step S12). In step S12, the location setup module 26 sets coordination for all pixels included in the image data of the photographic image 500 by regarding the horizontal direction as X axis and the vertical direction as Y axis.

The location setup module 26 of the information processing device 10 acquires actual location information corresponding to each pixel in the photographic image data captured by the fixed camera 100 (step S13). In step S13, the location setup module 26 acquires GPS coordinates of the imaging target area from the GPS system. The location setup module 26 acquires actual GPS coordinates corresponding to the coordinates of each pixel of photographic image 500.

The location setup module 26 of the information processing device 10 associates the position of the photographic image data setup in step S12 with actual location information at each position of the photographic image data acquired in step S13, and creates the location information database shown in FIG. 8 (step S14). The location information memory module 31 of the information processing device 10 stores the location information database created in step S14.

Location Information Database

FIG. 8 shows a figure illustrating the location information database stored by the location information memory module 31 of the information processing device 10. In FIG. 8, the location information memory module 31 associates and stores each position of the photographic image data and the actual position corresponding to each position of photographic image data. In FIG. 8, the image position denotes the coordinates at each position in the photographic image data. Moreover, in FIG. 8, GPS coordinates (latitude and longitude) denote actual GPS coordinates corresponding to the coordinates at each position in the photographic image data. The location information database is created for each pixel of all the photographic image data of the imaging target area 3 for each fixed camera 100.

Next, the monitoring object existence judgment module 21 of the information processing device 10 judges whether or not the monitoring object is included in the received photographic image data (step S15). In step S15, the monitoring object existence judgment module 21 executes the image recognition on the received photographic image data, and extracts the feature of the photographic image data. The monitoring object existence judgment module 21 searches the monitoring object database based on the extracted feature, and judges whether or not the monitoring object is included in the photographic image data by judging the existence of the image data matched with the feature extracted this time.

Monitoring Object Database

FIG. 9 shows a figure illustrating the monitoring object database stored by the monitoring object memory module 31 of the information processing device 10. In FIG. 9, the monitoring object storage module 31 associates and stores the image data that shows a feature image of the monitoring object, the type of the monitoring object, the intimidating method. In FIG. 9, the image data is a feature image data to identify the monitoring object. Moreover, in FIG. 9, the type is an identifier that shows the type of the monitoring object. Moreover, in FIG. 9, the intimidating method shows the intimidating method executed by the intimidating device 200 described later. In FIG. 9, the image data is described as an image, but it may be other data mode.

If the monitoring object existence judgment module 21 of the information processing device 10 fails to search a feature matched with the feature of the extracted photographic image data from the monitoring object database (step S15: NO), that is, if judging that the monitoring object does not exist in the photographic image data, the monitoring object existence judgment module 21 of the information processing device 10 terminates the process.

Figure 10:
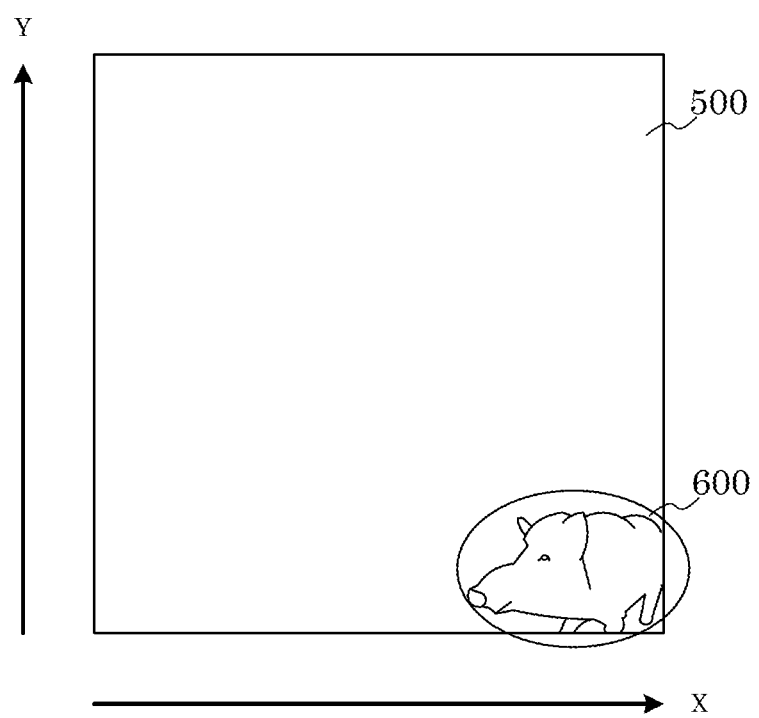
FIG. 10 shows a figure illustrating the photographic image 500 imaged by the fixed camera 100.

Next, the case if the information processing device 10 receives photographic image data of the photographic image 500 shown in FIG. 10 is described. In FIG. 10, the photographic image 500 includes the image of the object 600.

If the monitoring object existence judgment module 21 of the information processing device 10 succeeds to search a feature matched with the feature of the extracted photographic image data from the monitoring object database (step S15: YES), that is, if judging that the monitoring object exists in the photographic image data, the location information acquisition module 22 of the information processing device 10 acquires the location information in the photographic image of this monitoring object (step S16). In step S15, the monitoring object existence judgment module 21 also extracts the feature of object 600 when extracting the feature of photographic image 500. The monitoring object existence judgment module 21 searches a feature matched with the feature of extracted object 600 from the monitoring object database. In this embodiment, as the feature of object 60 is matched with the feature of the image data of which the type is associated with the wild boar, it can be judged that the monitoring object is included in the photographic image data.

In step S16, the location information acquisition module 22 of the information processing device 10 acquires the location information of the feature extracted in step S15 based on the position in the horizontal direction/vertical direction of the photographic image data.

The location information acquisition module 22 of the information processing device 10 searches the location information database based on the position of the monitoring object in the photographic image data acquired this time, and acquires actual location information associated with the position of the monitoring object in the photographic image data (step S17).

The location information transmitter module 23 of the information processing device 10 transmits actual location information of the monitoring object to the intimidating device 200 and the wireless aircraft 300 (step S18).

The intimidating device 200 receives actual location information of the monitoring object transmitted from the information processing device 10, and executes the intimidating process described later (step S19).

Moreover, the wireless aircraft 300 receives actual location information of the monitoring object transmitted from the information processing device 10, and executes the flight process described later (step S20).

Intimidating Process

Figure 5:
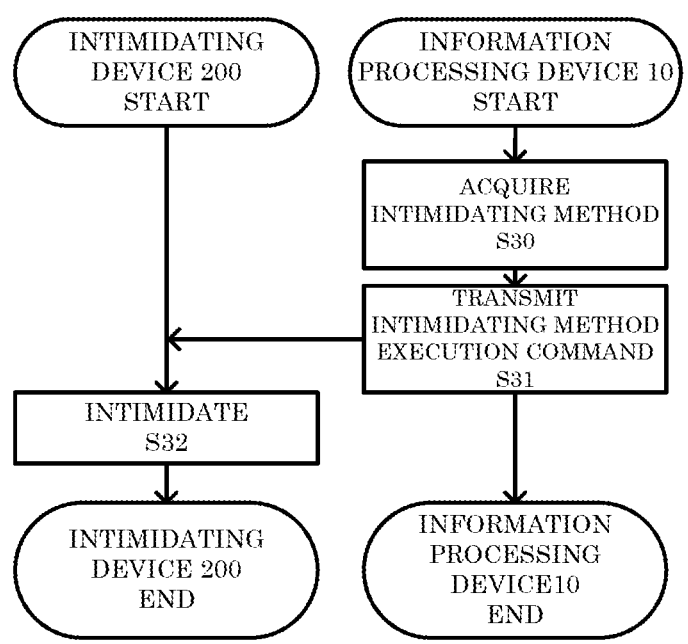
FIG. 5 shows a flow chart of the intimidating process executed by the information processing device 10 and the intimidating device 200.

FIG. 5 shows a flow chart of the intimidating process executed by the information processing device 10 and the intimidating device 200. The tasks executed by the modules of the above-mentioned devices will be explained below together with this process.

The intimidating instruction acquisition module 32 of the information processing device 10 searches the monitoring object database and acquires the intimidating method associated with the image data of the monitoring object in step S15 (step S30).

The intimidating instruction transmitter module 24 of the information processing device 10 generates an intimidating method execution command for making the intimidating device 200 to execute the intimidating method acquired by the intimidating instruction acquisition module 32 of the information processing device 10 in step S30, and transmits the generated intimidating method execution command to the intimidating device 200 (step S31).

The intimidating instruction receiver module 241 of the intimidating device 200 receives the intimidating method execution command transmitted from the information processing device 10. The intimidating device 200 intimidates the monitoring object based on the received intimidating method execution command (step S32).

For instance, in step S32, if the intimidating method execution command transmitted from the information processing device 10 is a type of the "light emission", the light emission module 250 of the intimidating device 200 executes the light emission by the light. In this case, the light emission is executed for instance by making the light emission module 250 to emit a light for a fixed time or turning on and off the light at a predetermined time interval. The light emitted from the light emission module 250 can be changed in color, shape, and light emission content, etc. accordingly.

For instance, in step S32, if the intimidating method execution command transmitted from the information processing device 10 is a type of the "sound emission", the sound emission module 251 of the intimidating device 200 executes the sound emission to output a sound for a fixed time or turning on and off the sound at a predetermined time interval. The sound emitted from the sound emission module 251 can be changed in content, type, and a method for sound emission, etc. accordingly.

The information processing device 10 may transmit an intimidating method execution command to execute an intimidating method by any mode other than the light emission and the sound emission mentioned above, and the intimidating device 200 may execute an intimidating method by any mode other than the light emission and the sound emission based on the intimidating method execution command transmitted from the information processing device 10. Moreover, the information processing device 10 may transmit an intimidating method execution command to execute the combination of the intimidating methods such as light emission and sound emission, and the intimidating device 200 may execute an intimidating method combining the light emission and sound emission based on the intimidating method execution command transmitted from the information processing device 10. Moreover, the intimidating method execution command transmitted from the information processing device 10 and the intimidating method executed by the intimidating device 200 based on the intimidating method execution command may be changed the type or the combination, etc. accordingly, and it is not limited to the embodiment mentioned above.

Flight Process

Figure 6:
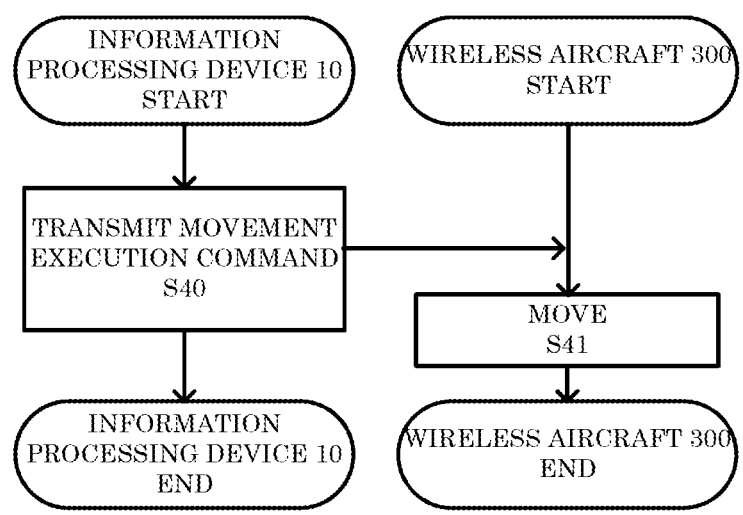
FIG. 6 shows a flow chart of the flight process executed by the information processing device 10 and the wireless aircraft 300.

FIG. 6 shows a flow chart of the flight process executed by the information processing device 10 and the wireless aircraft 300. The tasks executed by the modules of each of the above-mentioned devices will be explained below together with this process The movement instruction transmitter module 25 of the information processing device 10 generates a movement execution command to move the wireless aircraft 300 to the position of actual location information of the monitoring object acquired in step S17, and transmits the generated movement execution command to the wireless aircraft 300 (step S40).

The movement instruction receiver module 341 of the wireless aircraft 300 receives the movement execution command transmitted from the information processing device 10. The flight module 350 of the wireless aircraft 300 moves to the location showing the actual place of the monitoring object based on the received movement execution command (step S41).

The wireless aircraft 300 may execute an intimidating method similar to the intimidating method executed by the intimidating device 200 at the moved location. In this case, a light emission device such as a light and a sound emission device such as speaker may be installed in the intimidating device 200. Moreover, any intimidating device other than the light emission device and sound emission device mentioned above may be installed in the wireless aircraft 300.

In the embodiment mentioned above, the information processing device is described as a server device but the information processing device may be other device such as a portable terminal and a Personal Digital Assistant. Moreover, the portable terminal may be combined with the imaging device, and in case the portable terminal is combined with the imaging device, the portable terminal only has to include the above-described functions of the information processing device 10 and the fixed camera 100.

To achieve the means and the functions that are described above, a computer (including CPU, an information processor, and various terminals) reads and executes a predetermined program. For example, a program is provided in a form recorded in a computer-readable recording medium such as a flexible disk, a CD (e.g., CD-ROM), and a DVD (e.g., DVD-ROM and DVD-RAM). In this case, a computer reads a program from the recording medium, forwards and stores the program to and in an internal or an external storage, and executes it. For example, the program may be previously recorded in a memory (a record medium) such as a magnetic disk, an optical disk, and a magnetic optical disk, and then provided from the memory to the computer through a communication line.

The embodiments of the present invention are described above. However, the present invention is not limited to these embodiments. In addition, the effects described in these embodiments merely illustrate the most preferable effects resulting from the present invention, and the effects according to the present invention are not limited to those described in these embodiments.

REFERENCE SIGNS LIST

3 Imaging target area
5 Public line network
10 Information processing device
100 Fixed camera
200 Intimidating device
300 Wireless aircraft

What is claimed is:

1. An information processing device that monitors a monitoring object, comprising:
  a location information database that associates the vertical and horizontal position of image data captured by a fixed camera with actual location information corresponding to the position;
  a monitoring object judgment unit that judges whether or not the monitoring object is imaged in the image data;
  a location information output unit that outputs actual location information corresponding to the position of the image data to which the monitoring object is imaged, based on the location information database if the monitoring object is judged to be imaged;
  an intimidating instruction acquisition module that determines an intimidating method for intimidating the monitoring object based on a type of the imaged monitoring object if the monitoring object is judged to be imaged; and
  an intimidating instruction transmitter unit that transmits to an intimidating device an intimidating method execution command for making the intimidating device to execute the intimidating method.

2. The information processing device according to claim 1, wherein the location information output unit transmits the actual location information to a wireless aircraft.

3. The information processing device according to claim 1, further comprising:
a monitoring object database that previously stores image data of the monitoring object to be used for judging a monitoring object, the image data being associated with a type of a monitoring object and an intimidating method, wherein
the monitoring object judgment unit judges whether or not the monitoring object is imaged by applying image recognition based on the image data stored in the monitoring object database, and
the intimidating instruction acquisition module determines the intimidating method by searching to the monitoring object database.

4. A method of monitoring a monitoring object, comprising the steps of:
associating the vertical and horizontal position of the image data captured by the fixed camera with actual location information corresponding to the position in the location information database;
judging whether or not the monitoring object is imaged in the image data;
outputting actual location information corresponding to the position of the image data to which the monitoring object is imaged, based on the location information database if the monitoring object is judged to be imaged;
determining an intimidating method for intimidating the monitoring object based on a type of the imaged monitoring object if the monitoring object is judged to be imaged; and
transmitting to an intimidating device an intimidating method execution command for making the intimidating device to execute the intimidating method.

5. A computer program product for use in an information processing device capable of communicating with a location information database associating the vertical and horizontal position of image data captured by a fixed camera with actual location information corresponding to the position, comprising a non-transitory computer usable medium having a set of instructions physically embodied therein, the set of instructions including computer readable program code, which when executed by the electronic meeting server causes the information processing unit to:
judge whether or not the monitoring object is imaged in the image data;
output actual location information corresponding to the position of the image data to which the monitoring object is imaged, based on the location information database if the monitoring object is judged to be imaged;
determine an intimidating method for intimidating the monitoring object based on a type of the imaged monitoring object if the monitoring object is judged to be imaged; and
transmit to an intimidating device an intimidating method execution command for making the intimidating device to execute the intimidating method.

6. The information processing device according to claim 1, wherein the intimidating device includes an intimidating unit that intimidates the imaged monitoring object by emitting a light or a sound based on the intimidating method execution command, and
wherein at least one of the light or the sound is determined to be emitted based on the type of the imaged monitoring object.

7. The method according to claim 4, wherein judging whether or not the monitoring object is imaged in the image data includes judging whether or not the monitoring object is imaged by applying image recognition based on the image data stored in a monitoring object database that previously stores image data of the monitoring object to be used for judging a monitoring object, the image data being associated with a type of a monitoring object and an intimidating method, and
wherein determining the intimidating method includes determining the intimidating method by searching to the monitoring object database.

8. The method according to claim 4, wherein the intimidating device includes an intimidating unit that intimidates the imaged monitoring object by emitting a light or a sound based on the intimidating method execution command, and
wherein at least one of the light or the sound is determined to be emitted based on the type of the imaged monitoring object.

9. The computer program product according to claim 5, wherein judging whether or not the monitoring object is imaged in the image data includes judging whether or not the monitoring object is imaged by applying image recognition based on the image data stored in a monitoring object database that previously stores image data of the monitoring object to be used for judging a monitoring object, the image data being associated with a type of a monitoring object and an intimidating method, and
wherein determining the intimidating method includes determining the intimidating method by searching to the monitoring object database.

10. The computer program product according to claim 5, wherein the intimidating device includes an intimidating unit that intimidates the imaged monitoring object by emitting a light or a sound based on the intimidating method execution command, and
wherein at least one of the light or the sound is determined to be emitted based on the type of the imaged monitoring object.

* * * * *